3,542,865
ETHYLENIC SULFILIMINES

Horst O. Bayer, Levittown, Pa., assignor to Rohm & Haas Company, Philadelphia, Pa., a corporation of Delaware
No Drawing. Filed Feb. 16, 1968, Ser. No. 705,916
Int. Cl. C07c *143/78*
U.S. Cl. 260—556                    10 Claims

ABSTRACT OF THE DISCLOSURE

Selectively oxidized ethylenic sulfilimines of the formula

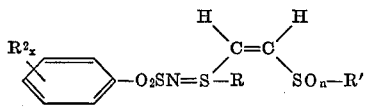

are useful in a broad spectrum of biological end uses to protect agricultural, organic and related articles from attack by noxious living organisms, such as fungi, bacteria and algae.

---

This invention relates no novel selectively oxidized ethylenic sulfilimines, to methods for their preparation, and to agricultural compositions containing them as the active ingredient. More particularly, this invention relates to novel biocidally active compositions comprising ethylenic sulfilimines characterized by either hydrocarbylsulfinyl or hydrocarbylsulfonyl ethylenic substitution which is hereinafter defined. The novel compounds are used to protect agricultural, organic and related articles, such as textiles, paints, plastics and detergents from attack by noxious living organisms, such as fungi, bacteria and algae.

Although there are literature reviews, such as F. Challenger, "Organic Sulfur Compounds," vol. I, Pergamon Press, New York, N.Y., 1961, pp. 339–349 relating to the production of sulfilimines by condensation reactions involving various sulfides with sodium toluene-p-sulfonchloroamide, referred to hereinafter as chloroamine-T, there has not been even a remote suggestion of the compounds of this invention. Sulfilimines have been prepared generally by reacting an aqueous solution of chloroamine-T with a solvent solution of a halogen-containing sulfide, such as 2-bromoethylethylsulfide to produce a quadrivalent sulfur compound. Additionally, chloroamine-T has been reacted with RSC$_6$H$_4$SR′, RSCH=CHSR and RS(CH$_2$)$_n$SR.

In accordance with this invention novel biocidally active selectively oxidized ethylenic sulfilimines are produced in a reaction process which comprises reacting chloroamine-T with a cis- or trans-1,2-bis(hydrocarbylthio)ethylene to form a condensation product containing a quadrivalent sulfur atom, and then selectively reacting the condensation product with an oxidizing agent under controlled conditions to produce either cis- or trans-1-(hydrocarbylthio - S - tolylsulfonylimino) - 2 - hydrocarbylsulfinyl and hydrocarbylsulfonyl)ethylenes, or a mixture thereof.

The compounds of this invention can exist as either the cis or the trans isomer. The following is a generic formula for the compounds of this invention; although it is represented as a cis isomer, it is also intended to cover the corresponding trans isomer:

(I)
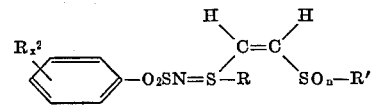

where $n$ is an integer from 1 to 2 inclusive; $x$ is 0 or the integer 1; R and R′ are hydrocarbyl radicals and may be the same or different, and are selected from aryl groups, such as phenyl, etc., halophenyl such as p-chlorophenyl, p-fluorophenyl, etc., alkoxyaryl groups such as methoxyphenyl, etc., alkaryl groups such as tolyl, etc., aralkyl groups such as benzyl, phenethyl, etc., halobenzyl such as p-chlorobenzyl, p-fluorobenzyl, etc., alkoxybenzyl such as methoxybenzyl, etc.; R$^2$ is selected from hydrogen, C$_1$–C$_6$ alkyl and halogen.

It has been discovered that the selectively oxidized sulfilimines of this invention are more active than their nonoxidized analogs in controlling the growth and propagation of noxious living organisms, such as fungi, bacteria and algae.

Suitable oxidizing agents that may be used in this invention are those capable of oxidizing sulfides such as hydrogen peroxide, organic per-acids such as m-chloroperbenzoic acid, peracetic acid, performic acid, perbenzoic acid; potassium permanganate, sodium hypochlorite, chromic oxide, dilute nitric acid, etc. There is no general scheme for selectively oxidizing the sulfilimines ($n$=0) because the sulfilimine group won't survive certain conditions of temperature and pH. In the examples described hereinbelow m-chloroperbenzoic and hydrogen peroxide were used to selectively oxidize the corresponding 1,2-bis (hydrocarbylthio)-S-tolylsulfonyliminoethylene. The oxidation reaction conditions will vary with the particular oxidizing agents used.

Suitable solvents that can be used, if desired, as the oxidation reaction medium are hydrocarbons, such as benzene, heptane, petroleum ether, toluene or the like, chlorinated hydrocarbons, such as carbon tetrachloride, methylene chloride, ethylene chloride, chlorobenzene or the like, alcohols, such as ethanol, ketones such as acetone, esters such as ethyl acetate, or an excess of one or the other reactant or product serving as solvent.

Representative compounds within the generic structure of this invention are cis-1-(phenylsulfinyl)-2-(phenylthio-S-tosylimino) ethylene,
cis-1-(phenylthio-S-tosylimino)-2-(phenylsulfonyl) ethylene,
trans-1-(phenylthio-S-tosylimino)-2-(phenylsulfinyl) ethylene,
trans-1-(phenylthio-S-tosylimino)-2-(phenylsulfonyl) ethylene,
cis-1-(p-tolylthio-S-tosylimino)-2-(p-tolylsulfinyl) ethylene,
cis-1-(benzylsulfinyl)-2-(benzylthio-S-tosylimino) ethylene,
cis-1-(benzylthio-S-tosylimino)-2-(benzylsulfonyl) ethylene,
trans-1-(benzylsulfinyl)-2-(benzylthio-S-tosylimino) ethylene,
trans-1-(benzylthio-S-tosylimino)-2-(benzylsulfonyl) ethylene,
cis-1-(p-methoxybenzylthio-S-tosylimino)-2-(p-methoxybenzylsulfinyl)ethylene,
cis-1-(p-fluorophenylsulfinyl)-2-(p-methoxybenzylsulfinyl)ethylene,
cis-1-(p-fluorophenylsulfinyl)-2-(p-fluorophenylthio-S-tosylimino)ethylene,
cis-1-(p-fluorophenylthio-S-tosylimino)-2-(p-fluorophenylsulfonyl)ethylene,
cis-1-(p-chlorophenylsulfinyl)-2-(p-chlorophenylthio-S-tosylimino)ethylene,
cis-1-(p-methoxyphenylsulfinyl)-2-(p-methoxyphenylthio-S-tosylimino)ethylene,
cis-1-(p-methoxyphenylthio-S-tosylimino)-2-(p-methoxyphenylsulfonyl)ethylene.

PROCEDURES

The term "tosyl" as used herein represents the p-tolylsulfonyl radical.

To assist those skilled in the art to practice the present invention, the following procedures are suggested by way of illustration, parts and percentages being by weight unless otherwise specifically noted.

(1) Trans-1,2-bis(phenylthio)-S-tolylsulfonyliminoethylene

To 24.0 g. [0.0985 mole] of trans-1,2-bis(phenylthio)ethylene in 200 ml. of dimethylformamide was added 56.0 g. [0.199 mole] of chloroamine-T. The mixture was stirred for about twenty-four hours at room temperature, and then poured into the liter of iced water. The chilling caused the separation of a thick, colorless oil. The aqueous layer was decanted and the oil was stirred into methanol. After standing for several hours at room temperature, a colorless solid formed which was collected by filtration and dried to provide 34.2 g. (83% yield) of trans-1,2-bis(phenylthio)-S-tolylsulfonyliminoethylene having a melting point of 89–90° C.

*Analysis.*—Calc'd for $C_{21}H_{19}NO_2S_3$: Theoretical (percent): C, 60.99; H, 4.63; N, 3.39; S, 23.26. Found (percent): C, 60.90; H, 4.51; N, 3.48; S, 22.92.

The ethylenic sulfilimine intermediate produced in Procedure (1) was then selectively oxidized, as in Procedures (2) and (3) to produce compounds of this invention.

(2) Trans-1-(phenylthio-S-tolylsulfonylimino)-2-(phenylsulfinyl)ethylene

To 15.0 g. [0.0364 mole] of trans-1,2-bis(phenylthio)-S-tolylsulfonyliminoethylene dissolved in 100 ml. of chloroform at 0° C. was added 7.5 g. [0.037 mole] of eighty-five percent m-chloroperbenzoic acid. The mixture was stirred for one-half hour at 0° C. The mixture was then permitted to stand at room temperature. After about one hour the mixture was again cooled to 0° C. The insoluble m-chlorobenzoic acid was separated by filtration. The filtrate was stripped and the concentrate was mixed with 75 ml. of methanol. On standing, a colorless solid formed which was separated by filtration and recrystallized from methanol giving 12.5 g. (80% yield) of trans - 1 - (phenylthio-S-tolylsulfonylimino)-2-(phenylsulfinyl)ethylene having a melting point of 158–160° C.

*Analysis.*—Calc'd for $C_{21}H_{19}NO_3S_3$: Theoretical (percent): C, 58.72; H, 4.46; N, 3.26; S, 22.39. Found (percent): C, 58.46; H, 4.39; N, 3.38; S, 21.80.

(3) Trans-1-(phenylthio-S-tolylsulfonylimino)-2-(phenylsulfonyl)ethylene

To 4.0 g. [0.00933 mole] of trans-1-(phenylthio-S-tolylsulfonylimino)-2-(phenylsulfinyl)ethylene dissolved in 25 ml. of chloroform was slowly added 2.5 g. [0.0121 mole] of eighty-five percent m-chloroperbenzoic acid at about 10° C. When addition was completed, the mixture was stirred for one-half hour and then cooled in an ice bath. The insoluble m-chlorobenzoic acid was separated by filtration. The filtrate was stripped and the concentrate was taken up in hot methanol. The concentrate solution was then cooled to form a colorless solid which was filtered and dried to provide 3.0 g. (72% yield), of trans-1 - (phenylthio-S-tolylsulfonylimino) - 2-(phenylsulfonyl)ethylene having a melting point of 140–142° C.

*Analysis.*—Calc'd for $C_{21}H_{19}NO_4S_3$: Theoretical (percent): C, 56.61; H, 4.30; N, 3.14; S, 21.59. Found: (percent): C, 56.84; H, 4.18; N, 3.05; S, 21.60.

The preparation of cis-1,2 - bis(p-tolylthio)-S-tolylsulfonyliminoethylene which is used as a starting material in Procedures (4) and (5) is described by Leandri et al., Ann. Chem. Rome, 50, 1616–26 (1960).

(4) Cis-1-(p-tolylthio-S-tolylsulfonylimino)-2-(p-tolylsulfinyl)ethylene

To 5.0 g. [0.0113 mole] of cis-1,2-bis(p-tolylthio)-S-tolylsulfonyliminoethylene in 50 ml. of chloroform at 0° C. was slowly added 2.44 g. [0.0119 mole] of eighty-five percent m-chloroperbenzoic acid. The mixture was allowed to stand for one hour at room temperature. The reaction mixture was then cooled to about 5° C. The insoluble m-chlorobenzoic acid was then removed by filtration. The filtrate was extracted with ten percent sodium hydroxide solution, then dried over anhydrous sodium sulfate and stripped to produce a gum-like concentrate. The concentrate was taken up in 25 ml. of hot methanol. The solution was then cooled to form a colorless precipitate which was filtered and dried to provide 3.3 g. (64% yield) of cis-1-(p-tolylthio-S-tolylsulfonylimino)-2-(p-tolylsulfinyl)ethylene having a melting point of 141–142° C.

*Analysis.*—Calc'd for $C_{23}H_{23}NO_3S_3$: Theoretical (percent): S, 60.36; H, 5.06; N, 3.06; S, 21.02. Found (percent): C, 60.37; H, 5.27; N, 2.81; S, 20.94.

(5) Cis-1-(p-tolylthio-S-tolylsulfonylimino)-2-(p-tolylsulfonyl)ethylene

To 7.0 g. [0.0158 mole] of cis-1,2-bis(p-tolylthio)-S-tolylsulfonyliminoethylene in 20 ml. of glacial acetic acid was added 7.0 ml. of thirty-five percent hydrogen peroxide. The mixture was heated to about 60° C. and held at this temperature for one hour. The reaction mixture was cooled and poured into 100 ml. of iced water. A solid formed and was separated by filtration and recrystallized from methanol to provide 5.5 g. (73% yield) of cis-1 - (p-tolylthio-S-tolylsulfonylimino) - 2-(p-tolylsulfonyl)ethylene having a melting point of 137–139° C.

*Analysis.*—Calc'd for $C_{23}H_{23}NO_4S_3$: Theoretical (percent): C, 58.33; H, 4.89; N, 2.95; S, 20.31. Found (percent): C, 58.26; H, 4.88; N, 2.91; S, 20.22.

The following Tables A and B list compounds that were prepared in accordance with the methods described in Procedures (2) and (3), respectively. The compounds listed conform to the formula $$CH_3C_6H_5SO_2N=S(R)CH=CHSO_nR'$$

where R and R' represent, in this instance, the same radical. In the elemental analysis portion of the table, "T" represents theoretical and "F" represents found.

TABLE A

| R and R' | n | Isomer | Percent yield | M.P. | Carbon | | Hydrogen | | Nitrogen | | Sulfur | | Halogen | |
|---|---|---|---|---|---|---|---|---|---|---|---|---|---|---|
| | | | | | T | F | T | F | T | F | T | F | T | F |
| F—⟨⟩— | 1 | Cis | 23 | 65–72 | 54.18 | 54.50 | 3.68 | 3.81 | 3.01 | 3.13 | 20.66 | 20.92 | 8.16 | 9.85 |
| Cl—⟨⟩— | 1 | Cis | 42 | 95–7 | 50.60 | 50.54 | 3.44 | 3.66 | 2.81 | 3.50 | 19.40 | 19.52 | | |
| CH₃O—⟨⟩— | 1 | Cis | 53 | 115–17 | 56.42 | 56.44 | 4.73 | 4.64 | 2.86 | 3.02 | 19.65 | 19.58 | | |
| ⟨⟩—CH₂— | 1 | Cis | 61 | 153–5 | 60.37 | 60.40 | 5.07 | 5.00 | 3.61 | 3.68 | 21.02 | 20.58 | | |
| ⟨⟩—CH₂— | 1 | Trans | 44 | 152–4 | 60.37 | 60.80 | 5.07 | 5.18 | 3.61 | 3.25 | 21.02 | 20.57 | | |

TABLE B

| R and R' | n | Isomer | Percent yield | M.P. | Carbon T | Carbon F | Hydrogen T | Hydrogen F | Nitrogen T | Nitrogen F | Sulfur T | Sulfur F | Halogen T | Halogen F |
|---|---|---|---|---|---|---|---|---|---|---|---|---|---|---|
| F—⟨phenyl⟩— | 2 | Cis | 84 | 126–30 | 52.38 | 52.48 | 3.55 | 3.66 | 2.90 | 3.18 | 19.98 | 20.10 | | |
| Cl—⟨phenyl⟩— | 2 | Cis | 40 | 140–6 | 49.03 | 49.03 | 3.31 | 3.29 | 2.73 | 2.81 | 18.70 | 17.72 | 13.78 | 13.79 |
| CH₃O—⟨phenyl⟩— | 2 | Cis | 69 | 121–3 | 54.63 | 54.60 | 4.59 | 4.51 | 2.77 | 2.81 | 19.03 | 19.31 | | |
| ⟨phenyl⟩—CH₂— | 2 | Cis | 75 | 146–8 | 58.33 | 58.46 | 4.89 | 5.12 | 2.95 | 3.20 | 20.31 | 20.18 | | |
| ⟨phenyl⟩—CH₂— | 2 | Trans | 61 | 151–3 | 58.33 | 58.46 | 4.89 | 5.00 | 2.95 | 2.91 | 20.31 | 20.08 | | |

To illustrate their broad spectrum of biological activity, compounds of this invention were bioassayed in standard fungicide, bactericide, and algicide tests. Specifically, fungicidal activity was determined in standard fungicidal tests against *Piricularia oryzae* (Cav.), *Helminthosporium oryzae*, *Alternaria solani*, *Botrytis fabae* and *Erysiphe polygoni*. Fungicidal activity was also determined in streak tests and serial dilution tests against *Aspergillus niger*, *Rhizopus* sp. and *Rhodotorula* sp. Bactericidal activity was determined in streak tests and serial dilution tests against *Escherichia coli* and *Staphylococcus aureus*, and in additional streak tests against *Pseudomonas aeruginosa*. Algicidal activity was determined in streak tests against *Chlorella pyrenoidosa*, "Square D" algae and *Scenedesmus obliquus*, and in serial dilution tests against *Chlorella pyrenoidosa* and *Phormidium inundatum*. The results of the various biocidal evaluation tests are given in tabular form following the description of the test method. In the tables, the active ingredients (A.I.) are represented by the letters A to O which are respectively:

| A.I. | Chemical name |
|---|---|
| A | Cis-1,2-bis(p-fluorophenylthio)-S-tosyliminoethylene. |
| B | Cis-1-(p-fluorophenylsulfinyl)-2-(p-fluorophenylthio-S-tosylimino)ethylene. |
| C | Cis-1-(p-fluorophenylthio-S-tosylimino)-2-(p-fluorophenylsulfonyl)ethylene. |
| D | Cis-1,2-bis(p-methoxyphenylthio)-S-tosyliminoethylene. |
| E | Cis-1-(p-methoxyphenylsulfinyl)-2-(p-methoxyphenylthio-S-tosylimino)ethylene. |
| F | Cis-1-(p-methoxyphenylthio-S-tosylimino)-2-(p-methoxyphenylsulfonyl)ethylene. |
| G | Cis-1,2-bis(phenylthio)-S-tosylimino ethylene. |
| H | Cis-1-(phenylsulfinyl)-2-(phenylthio-S-tosylimino)ethylene. |
| I | Cis-1-(phenylthio-S-tosylimino)-2-(phenylsulfonyl)ethylene. |
| J | Trans-1,2-bis(phenylthio)-S-tosylimino ethylene. |
| K | Trans-1-(phenylthio-S-tosylimino)-2-(phenylsulfinyl)ethylene. |
| L | Trans-1-(phenylthio-S-tosylimino)-2-(phenylsulfonyl)ethylene. |
| M | Cis-1-(tolylthio-S-tosylimino)-2-(tolylsulfinyl)ethylene. |
| N | Cis-1-(tolylthio-S-tosylimino)-2-(tolylsulfonyl)ethylene. |
| O | Cis-1-(chlorophenylthio-S-tosylimino)-2-(chlorophenylsulfinyl)ethylene. |

TOMATO EARLY BLIGHT

Biocidal evaluation tests were conducted in which ethylenic sulfilimines having only hydrocarbylthio ethylenic substitution ($n=0$) were compared with compounds representative of this invention in their ability to control the tomato early blight disease. Early blight is one of the most important defoliating diseases of the tomato. In the early blight control test, tomato plants at the four-leaf stage were sprayed to run-off with suspensions containing 1200 p.p.m. of the compounds under evaluation. The sprayed plants were then allowed to dry. The plants were then weathered in a fog chamber for about 18 hours. They were then stored in the greenhouse at room temperature for about 24 hours. The plants were then inoculated with a suspension of 25,000–30,000 spores per ml. of *Alternaria solani*. The spores were incubated by holding the inoculated plants at about 52° F. and 100% relative humidity for about 22 hours. The plants were then placed in an illuminated test room and held at about 75° F. for a period of four days. The disease lesions that developed on the plants were then counted after the four day residence period in the illuminated test room. Each compound was then assigned an activity rating based on the lesion count. The activity ratings ranged from "not active" to "very active." A rating of "not active" indicated that the number of disease lesions counted were about the same as the number of disease lesions counted on an untreated plant. The results of the tests are given in Table I. In the table and hereinafter, the term "A.I." represents the active ingredient in the suspension used to spray the crop plant prior to its inoculation with the noxious organism; the oxidation levels of each test compound are represented by "I" when $n=0$, "II" when $n=1$, and "III" when $n=2$.

TABLE I.—CONTROL OF TOMATO EARLY BLIGHT

| A.I. | I | II | III |
|---|---|---|---|
| A | Not active | | |
| B | | Active | |
| C | | | Very active. |
| D | Not active | | |
| E | | Active | |
| F | | | Very active. |

CONTROL OF RICE BLAST

Tests to determine the ability of the compounds of this invention to control the disease of rice blast were conducted in the same manner as the persistency-type tests for the control of tomato early blight, except about 40,000 spores of *Piricularia oryzae* were substituted as the noxious organisms. The results of the tests are given in Table II.

TABLE II.—CONTROL OF RICE BLAST

| A.I. | I | II | III |
|---|---|---|---|
| G | Not active | | |
| H | | Active | |
| I | | | Very active. |
| J | Not active | | |
| K | | Active | |
| L | | | Very active. |

CONTROL OF RICE HELMINTHOSPORIUM

The compounds of this invention were evaluated in rice helminthosporium control tests. The tests were conducted in the same manner as the tests associated with Table I, except the spray treated plants were not subjected to weathering after drying. In addition, about 40,000 spores of *Helminthosporium oryzae* were substituted as the noxious organisms. The results of the tests are given in Table III.

TABLE III.—CONTROL OF RICE HELMINTHOSPORIUM

| A.I. | I | II | III |
|---|---|---|---|
| A | Not active | | |
| B | | Very active | |
| C | | | Very active. |
| G | Not active | | |
| H | | Very active | |
| I | | | Very active. |

CONTROL OF BOTRYTIS ON FABA BEAN

Tests were conducted in the same way as the tests for the control of rice helminthosporium, except 100,000 spores of *Botrytis cinerea* were substituted as the noxious organisms. The results of the tests are given in Table IV.

TABLE IV

| A.I. | I | II | III |
|---|---|---|---|
| A | Not active | | |
| B | | Very active | |
| C | | | Very active. |
| D | Not active | | |
| E | | Active | |
| F | | | Very active. |

In addition to the fungicidal tests described hereinabove, the antimicrobial activities of the ethylenic sulfilimines of this invention were evaluated against representative algae and bacteria in streak tests and in serial dilution tests.

SERIAL DILUTION TESTS

In the serial dilution tests, two-fold serial dilutions of the toxicant in the test medium were prepared in a dosage series ranging from about 1000 p.p.m. to about 0.5 p.p.m. The medium used for the tests against bacteria was Trypticase soy broth, and the medium used in the tests against algae was Allen's liquid medium. The test media were inoculated with the disease organisms. The inoculated media were then incubated. The test series was then inspected to determine the minimum amount of toxicant required to inhibit the growth of the noxious organisms. The minimum concentration of toxicant was then reported as either the minimum algaestatic concentration, referred to in Table V as "MAC" or the minimum bacteriostatic concentration, referred to in Table V as "MBC."

In the serial dilution tests against algae the noxious organisms were *Chlorella pyrenoidosa* (Chlor.) and *Phormidium inundatum* (Phor.). After inoculation with the noxious organisms, the treated media were incubated for seven days on a culture shaker at room temperature under continuous fluorescent light. The minimum microbistatic concentration was then based on the minimum concentration which inhibited growth.

In the serial dilution tests against bacteria the disease organisms were *Escherichia coli* (Esch.) and *Staphylococcus aureus* (Staph.). After inoculation with the noxious organisms, the treated media were incubated for 48 hours at 37° C. The results of the serial dilution tests are given in Table V. The symbols used in the table are defined hereinabove.

TABLE V.—SERIAL DILUTION TESTS

| | MAC (p.p.m.) | | MBC (p.p.m.) | |
|---|---|---|---|---|
| A.I. | Chlor. | Phor. | Staph. | Esch. |
| B | 2.0 | 1.0 | 63 | 1,000 |
| C | 1.0 | 0.5 | 31 | 500 |
| F | 1.0 | 0.25 | | |
| H | 1.0 | <0.5 | 31 | 500 |
| I | 0.5 | 0.25 | | |
| L | | | 31 | 1,000 |
| M | 5.0 | <0.5 | | |
| N | <0.5 | <0.5 | | |
| O | 1.0 | 0.25 | | |

STREAK TESTS

In the streak tests the test compounds were incorporated in a liquid agar at two concentrations namely at 10 p.p.m. in the test against algae and 1,000 p.p.m. in the tests against bacteria. The agar was then solidified and the disease producing organisms were streaked onto the solid surface of the agar. In the streak tests against algae the noxious organisms were *Scenedesmus obliquus* (Scen.), "Square D" algae (S.D.) and *Chlorella pyrenoidosa* (Chlor.). In the streak tests against bacteria the disease organisms were *Pseudomonas aeruginosa* (Pseud.), *Escherichia coli* (Esch.) and *Staphylococcus aureus* (Staph.). The medium used in the streak tests against algae was Allen's agar, and the medium used in the streak tests against bacteria was Tryptone glucose extract agar. After infection with the disease organisms, the treated agars were then incubated. The incubation periods for the algicidal and bactericidal streak tests were respectively 5 days at room temperature under fluorescent light, and 48 hours at 37° C. After the incubation period, the activity of the toxicant was evaluated on a rating scale of from 0 to 4 where 0 indicates complete inhibition of growth and excellent activity, 1 indicates considerable inhibition of growth and good activity, 2 indicates slight growth and moderate activity, 3 indicates slight inhibition of growth and 4 indicates a heavy growth equivalent to an untreated control and no activity. The results of the streak tests are given in Table VI. The symbols used in the table are defined hereinabove.

TABLE VI.—STREAK TESTS

| | Algae | | | Bacteria | | |
|---|---|---|---|---|---|---|
| A.I. | Chlor. | Scen. | S.D. | Pseud. | Staph. | Esch. |
| B | 0 | 0 | 0 | 1 | 1 | 1 |
| C | 0 | 0 | 0 | 0 | 0 | 0 |
| E | 0 | 0 | 0 | 1 | 0 | 4 |
| F | 0 | 0 | 0 | 4 | 0 | 4 |
| H | 0 | 0 | 0 | 4 | 0 | 4 |
| I | 0 | 0 | 4 | 4 | 0 | 4 |
| L | 0 | 2 | 4 | 0 | 0 | 0 |
| M | 0 | 0 | 0 | 4 | 0 | 4 |
| N | 0 | 0 | 2 | 4 | 0 | 0 |
| O | 0 | 0 | 0 | 2 | 0 | 4 |

The compounds of this invention are useful as broad spectrum fungicides. They can be applied to plants or other areas to be protected by contacting such area with a compound of this invention contained in a formulation that is suitable for dissemination as a fungicide. In certain operations, the unmodified compounds are distributed or incorporated in pesticidal amounts in adhesives, soaps, inks, plaster wallboard, cutting oils, textiles, paper, polymeric materials, paints, embalming fluids, lumber, wood products or growth media, below the ground or upon the surfaces of the above-ground portion of plants to prevent the attack of various fungal pests and the subsequent economic loss due to the degradation of such products by microorganisms. However, the present method also embraces the employment of liquid or dust compositions containing the toxicants. When the compounds of this invention are used as fungicides, they may be formulated as finely divided, wettable powders, dusts and granular materials, solutions, concentrates, emulsifiable concentrates, slurries, and the like, depending upon the particular application intended and the formulation media desired. In such usage, the compounds are modified with one or a plurality of additaments of adjuvants including water, organic solvents, petroleum oils, petroleum distillates, naphthas, or other liquid carriers, polymeric thickening agents, urea, surface-active dispersing agents and finely divided inert solids. When liquid formulations are employed, or dry materials prepared which are to be used in liquid form, it is desirable, in certain instances, additionally to employ a wetting, emulsifying or dispersing agent to facilitate use of the formulation. Suitable surfactants are disclosed by J. W. McCutcheon in Soap and Chemical Specialties, vol. 31, Nos. 7 to 10 (1955).

Th exact concentration of the toxicants to be employed in the treating compositions in not critical and may vary considerably provided the required dosage of the effective agent is supplied to the area to be treated. The concentration of toxicant in liquid compositions generally is from about 0.0001 to 50 percent by weight. Concentrations up to 95 percent by weight are oftentimes conveniently employed. In dusts, the concentrations of the toxicant can be from about 0.1 to 95 percent by weight. In compositions to be employed as concentrates, the toxicants can be present in a concentration of from 5 to 98 percent by weight. The quantity of treating composition to be applied to textiles, lumber or growth media or to the foliage of plants may vary considerably provided that the required dosage of active ingredients is applied in sufficient amounts of the finished composition adequately to cover the vegetation to be treated or to facilitate the penetration and distribution of said ingredients in and on textiles, lumber or growth media.

In the preparation of dust compositions, the toxicant products can be compounded with any of the finely divided solids, such as pyrophyllite, talc, chalk, gypsum, and the like. In such operations, the finely divided carrier is ground or mixed with the toxicant or wet with a solution of the toxicant in a volatile organic solvent. Similarly, dust compositions containing the products can be compounded with various solid surface-active dispersing agents such as fuller's earth, bentonite, attapulgite and other clays. Depending upon the proportions of ingredients, these dust compositions can be employed for the control of pests or employed as concentrates and subsequently diluted with an additional solid surface-active dispersing agent or with pyrophyllite, chalk, talc, gypsum and the like to obtain the desired amount of active ingredient in a composition adapted to be employed for the control of fungi. Also, such dust compositions when employed as concentrates can be dispersed in water, with or without the aid of dispersing agents to form spray mixtures.

Further, spray compositions can be prepared by incorporating the toxicants of this invention or their liquid or dust concentrate compositions in intimate mixtures with surface-active dispersing agents such as an ionic or nonionic emulsifying agent. Such compositions are readily employed for the control of pests or are dispersed in liquid carriers to form diluted sprays containing the toxicants in any desired amount. The choice of dispersing agents and amounts thereof employed are determined by the ability of the agents to facilitate the dispersion of the concentrate in the liquid carrier to produce the desired spray compositions.

Similarly, the toxicant products can be compounded with a suitable water-immiscible organic liquid and a surface-active dispersing agent to produce an emulsifiable concentrate which can be further diluted with water and oil to form spray mixtures in the form of oil-in-water emulsions. In such compositions, the carrier comprises an aqueous emulsion, i.e., a mixture of water-immiscible solvent, emulsifying agent and water. Preferred dispersing agent which can be employed in these compositions are oil-soluble and include the non-ionic emulsifiers such as polyoxyethylene derivatives or sorbitan esters, complex ether alcohols and the like. Also, oil-soluble ionic emulsifying agents such as mahogany soaps can be used. Suitable organic liquids which can be employed in the composition include petroleum oils and distillates, toluene, liquid halohydrocarbon and synthetic organic oils. The surface-active dispersing agents are usually employed in liquid compositions in the amount of from 0.1 to 20 percent by weight of the combined weight of the dispersing agent and active compound.

In addition, other liquid compositions containing the desired amount of effective agent can be prepared by dissolving the toxicant in an organic liquid such as acetone, methylene chloride, chlorobenzene and petroleum distillates. The preferred organic solvent carriers are those which are adapted to accomplish the penetration and impregnation of the pest environment and particularly soil with the toxicant compounds and are of such volatility as to leave little permanent residue thereon. Particularly desirable carriers are the petroleum distillates boiling almost entirely under 400° F. at atmospheric pressure and having a flash point of about 80° F.

In further embodiments, the toxicants as employed in accordance with the present invention, or compositions containing the same, can be advantageously employed in the present invention in combination with one or more pesticidal or preservative compound. In such embodiment, such pesticidal or preservative compound is employed either as a supplemental toxicant, an additament or as an adjuvant. Representative pesticidal compounds include:

Dithiocarbamate compounds.—Such as ferbam (tris[dimethyldithiocarbamato]iron), maneb ([ethylenebis(dithiocarbamato)]manganese), mancozeb (the coordination product of zinc ion and manganese ethylenebisdithiocarbamate), nabam(disodium ethylenebis[dithiocarbamate]), thiram(bis[dimethylthiocarbamoyl]disulfide), zineb([ethylenebis(dithiocarbamato)]zinc), ziram(bis[dimethyldithiocarbamato]zinc);

Other common named fungicides.—Such as captan (N-[(trichloromethyl)thio]-4-cyclohexene - 1,2 - dicarboximide), chloranil (tetrachloro-para-benzoquinone), dichlone (2,3-dichloro-1,4-naphthoquinone), glyodin (2-heptadecyl-2-imidazoline acetate), binapacryl (2-sec-butyl-4,6-dinitrophenyl 3-methyl-2-butenoate), dodine (n-dodecylguanidine acetate), folpet (N-[trichloromethylthio]phthalimide);

Quaternary ammonium compounds.—Such as dialkyl dimethylammonium chloride, alkyl dimethyl benzyl ammonium chloride;

Anilides.—Such as 2,3-dihydro - 5 - carboxanilide-6-methyl-1,4-oxathiin, 2,3-dihydro - 5 - carboxanilide-6-methyl-1,4-oxathiin - 4,4 - dioxide, halogenated salicylanilides such as tribrominated salicylanilides, trifluoromethyl salicylanilide;

Azines.—Such as 4-methyl-2,3,5,10-tetrahydro-3,5,10-dioxonapthalino(2,3-b)-1,4-thiazine;

Azoles.—Such as 2-mercaptobenzothiazole, 3-trichloromethyl-5-ethoxy-1,2,4-thiadiazole;

Quinones.—Such as 2,3-dinitro-1,4-dithia-anthraquinone;

Uracils.—Such as 6-aza-uracil;

Organosulfur compounds;

Organometallic compounds.—Such as phenylmercuric acetate, phenylmercuric oleate, phenylmercuric propionate, chloromethoxy acetoxy mercuripropane, bis-tributyl tin oxide, bis-tripropyl tin oxide, copper pentachlorophenate, copper 8-hydroxyquinolate, mercuric chloride, sodium borate, ethylmercuric chloride;

Miscellaneous other compounds, such as 3,5-dimethyl-tetrahydro-1,3,5,2H-thiadiazine-2-thione, dodecyl pyridinium chloride, 9-undecylenic acid, 10,10'-oxybisphenoxarsine and tetrachloroisophthalonitrile.

It is to be understood that changes and variations may be made without departing from the spirit and scope of this invention as defined by the appended claims.

What is claimed is:

1. A cis or trans compound of the formula

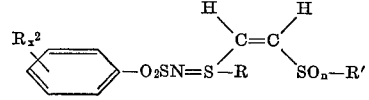

where $n$ is an integer from 1 to 2 inclusive; $x$ is 0 or the integer 1; R and R' may be the same or different, and are selected from the group consisting of phenyl, benzyl, tolyl, methoxy phenyl; halophenyl and halobenzyl; $R^2$ is selected from the group consisting of hydrogen, $C_1$–$C_6$ alkyl and halogen.

2. A cis or trans compound as defined in claim 1 wherein R and R' are the same or different and are selected from phenyl and tolyl, and $R^2$ is methyl.

3. A cis or trans compound as defined in claim 1 wherein $n$ is 1.

4. A cis or trans compound as defined in claim 1 wherein $n$ is 2.

5. A compound as defined in claim 1 wherein said compound is trans-1-(phenylthio - S - tosylimino)-2-(phenylsulfinyl)ethylene.

6. A compound as defined in claim 1 wherein said compound is trans-1-(phenylthio - S - tosylimino)-2-(phenylsulfonyl)ethylene.

7. A compound as defined in claim 1 wherein said compound is cis-1-(p-tolylthio - S - tosylimino)-2-(p-tolylsulfinyl)ethylene.

8. A compound as defined in claim 1 wherein said compound is cis-1-(p-tolylthio - S - tosylimino)-2-(p-tolylsulfonyl)ethylene.

9. A selective oxidation process for producing compounds of the formula of claim 1 which comprises reacting an oxidizing agent selected from the class of organic per-acids and hydrogen peroxide with the corresponding 1,2-bis(hydrocarbylthio)-S-tolyl - sulfonyliminoethylene in the presence of a solvent and at a temperature at which the hydrocarbylthio group is oxidized.

10. A process as defined in claim 9 wherein the oxidizing agent is hydrogen peroxide.

References Cited

UNITED STATES PATENTS

| 1,915,334 | 6/1933 | Salzberg et al. | 260—243 |
| 2,075,359 | 3/1937 | Salzberg et al. | 424—250 |

OTHER REFERENCES

Chemical Abstracts: vol. 55, p. 24623c, 1961, Leandri et al.

HENRY R. JILES, Primary Examiner

S. D. WINTERS, Assistant Examiner

U.S. Cl. X.R.

71—67, 118; 424—321; 260—609